United States Patent [19]
Onoguchi et al.

[11] Patent Number: 6,062,373
[45] Date of Patent: May 16, 2000

[54] METHOD AND APPARATUS FOR DISCHARGING A FOOD MATERIAL

[75] Inventors: Kazuyoshi Onoguchi; Yoshibumi Otake; Nobuo Kajikawa, all of Utsunomiya, Japan

[73] Assignee: Rheon Automatic Machinery Co., Ltd., Tochigi-ken, Japan

[21] Appl. No.: 08/998,112

[22] Filed: Dec. 24, 1997

[30] Foreign Application Priority Data

Dec. 27, 1996 [JP] Japan .................................. 8-358793

[51] Int. Cl.$^7$ ........................... B65G 29/00; B65G 37/00
[52] U.S. Cl. ........................... 198/625; 198/624; 198/786
[58] Field of Search ................................ 198/550.1, 624, 198/625, 786; 406/53, 59

[56] References Cited

U.S. PATENT DOCUMENTS

| | | | |
|---|---|---|---|
| 3,126,087 | 3/1964 | Anderson | 198/786 X |
| 3,841,946 | 10/1974 | Carter | 198/625 X |
| 5,385,074 | 1/1995 | Burch, Jr. | 198/625 X |
| 5,823,123 | 10/1998 | Waldner | 198/625 X |

FOREIGN PATENT DOCUMENTS 39-12276 of 0000 Japan .

*Primary Examiner*—Christopher P. Ellis
*Assistant Examiner*—Gene O. Crawford
*Attorney, Agent, or Firm*—Brinks Hofer Gilson & Lione

[57] ABSTRACT

A method and apparatus for discharging a food material is provided, in which a plurality of supply rollers provided with grooves or ridges on their surfaces are circularly disposed to form a funnel-shaped space, into which space the food material is charged. The food material is subjected to a circumferential force by the rotating supply rollers and is steadily fed downward, without slipping. Further, an apparatus for discharging a food material is provided, in which a supply pipe with a scraper is disposed under a food-material-supply section. The scraper is positioned adjacent the inner wall of the supply pipe or positioned such that the scraper slidably contacts the inner wall of the supply pipe, to thereby peel off the food material adhering to the inner wall, so as to stably feed the food material downward.

8 Claims, 8 Drawing Sheets

METHOD AND APPARATUS FOR DISCHARGING A FOOD MATERIAL

BACKGROUND OF INVENTION

1. Field of Invention

This invention relates to a method and apparatus for discharging a food material, more particularly to one for discharging a boiled rice material or other viscous materials in producing boiled rice balls and rice dumplings covered by bean jam.

2. Prior Art

Japanese Patent Publication No. 39-12276 discloses an apparatus for discharging a food material downward. The apparatus comprises three conical rollers disposed in upright positions to form a funnel-shaped space to receive the food material. In FIG. 1 (only two of the three rollers are shown), to illustrate a sectional view of the apparatus, these conical rollers 2 are rotated in the same direction at the same speed. The peripheral speed of each roller at a position indicated by an arrow A is faster than that at a position indicated by an arrow B. Therefore, the food material 4 charged into the funnel-shaped space, located at the position A, is subjected to a force in the circumferential direction, which force is greater than the force that the food material located at the position B is subjected to. Therefore, as shown by an arrow C, the food material is pulled downward.

In the prior-art apparatus some viscous food materials tend to slip on the surfaces of the conical rollers, so that the food materials cannot be smoothly fed downward. Furthermore, a rod-like food material 5 discharged from the funnel-shaped space has been not uniformly shaped. Namely, stably discharging the food material has been required. U.S. Pat. No. 5,385,074 discloses an apparatus and method for cutting helically-shaped potato pieces. The feed section of the apparatus comprises a plurality of rods disposed to form a funnel-shaped space. Each rod has a spirally-shaped outer surface. Each pair of adjacent rods is adapted to rotate in the same direction. However, as in FIG. 2, each pair of adjacent rods is adapted to rotate in the direction opposite to that of the other pair of adjacent rods. Namely, the rods do not all rotate in the same direction. Therefore, a food material within the funnel-shaped space would not be conveyed downward smoothly.

SUMMARY OF INVENTION

Therefore, this invention aims to provide a method and apparatus to prevent a food material from slipping on the surface of a supply roller, and to stably discharge the food material and to feed it to the next station.

One object of this invention is to provide a method of discharging a food material comprising circularly disposing a plurality of supply rollers to form a funnel-shaped space to receive said food material, providing grooves or ridges on the surface of each supply roller to enhance the frictional engagement of said supply rollers with said food material, and charging said food material into said funnel-shaped space, rotating said supply rollers so as to move said food material and to feed it downward, characterized by using said supply rollers to rotate in the same direction, and causing the central axes of said supply rollers to deviate from imaginary lines directed to the center of an imaginary circle formed by the surrounding supply rollers, thereby steadily feeding said food material downward.

By causing the supply rollers to rotate in the same direction, and causing the central axes of the supply rollers to deviate from the imaginary lines directed to the center of the imaginary circle formed by the surrounding supply rollers, the food material can be fed steadily downward.

Another object of this invention is to provide an apparatus for discharging a food material comprising a food-material-supply section which supplies a food material downward, said food-material-supply section comprising a plurality of rotatable supply rollers for supplying a food material downward, said supply rollers being circularly disposed so that they form a funnel-shaped space to receive said food material, the surface of each supply roller being provided with grooves or ridges, characterized by means for rotating said supply rollers in the same direction, and characterized in that the central axes of said supply rollers deviate from the imaginary lines directed to the, center of the imaginary circle formed by the surrounding supply rollers.

Still another object of this invention is to provide an apparatus for discharging a food material comprising a food-material-supply section which supplies a food material downward, said food-material-supply section comprising a plurality of rotatable supply rollers for supplying a food material downward, said supply rollers being circularly disposed so that they form a funnel-shaped space to receive said food material, characterized by a supply pipe disposed under said food-material-supply section, to make a passageway for the food material, a scraper provided in said supply pipe positioned adjacent the inner wall of said supply pipe or positioned so that said scraper slidably contacts the inner wall of said supply pipe, so as to prevent said food material from adhering to the inner wall of said supply pipe, and a means for rotating said supply pipe or said scraper relative to said scraper or said supply pipe, respectively.

By providing the scraper in the supply pipe, food material such as one of boiled rice can be smoothly fed downward without it adhering to the inner wall of the supply pipe. Namely, the scraper scrapes downward any boiled rice material adhering to the inside wall of the supply pipe. This leads to the food material being discharged stably.

The scraper can be shaped so that it extends from the top to the bottom of the inside wall of the supply pipe. Therefore, a wire-like scraper can be spirally wound and disposed to slide within the supply pipe. The scraper can be disposed separately from, and can be adapted to move slidably within, the supply pipe.

EXPLANATION OF THE PREFERRED EMBODIMENTS

An embodiment of this invention is now explained by reference to various Figures.

Figure 1:
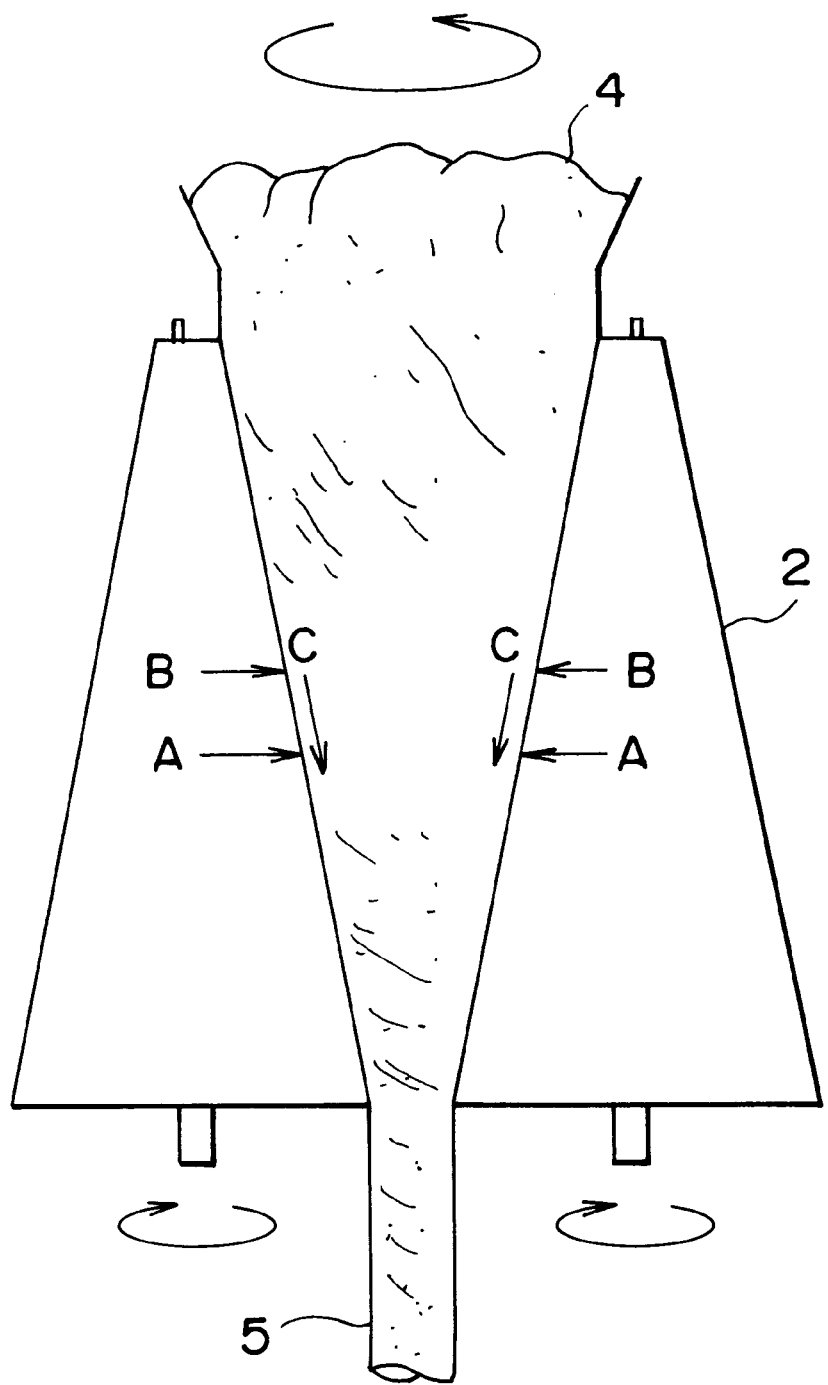
FIG. 1 shows a sectional side view of the prior-art apparatus.
Figure 2:
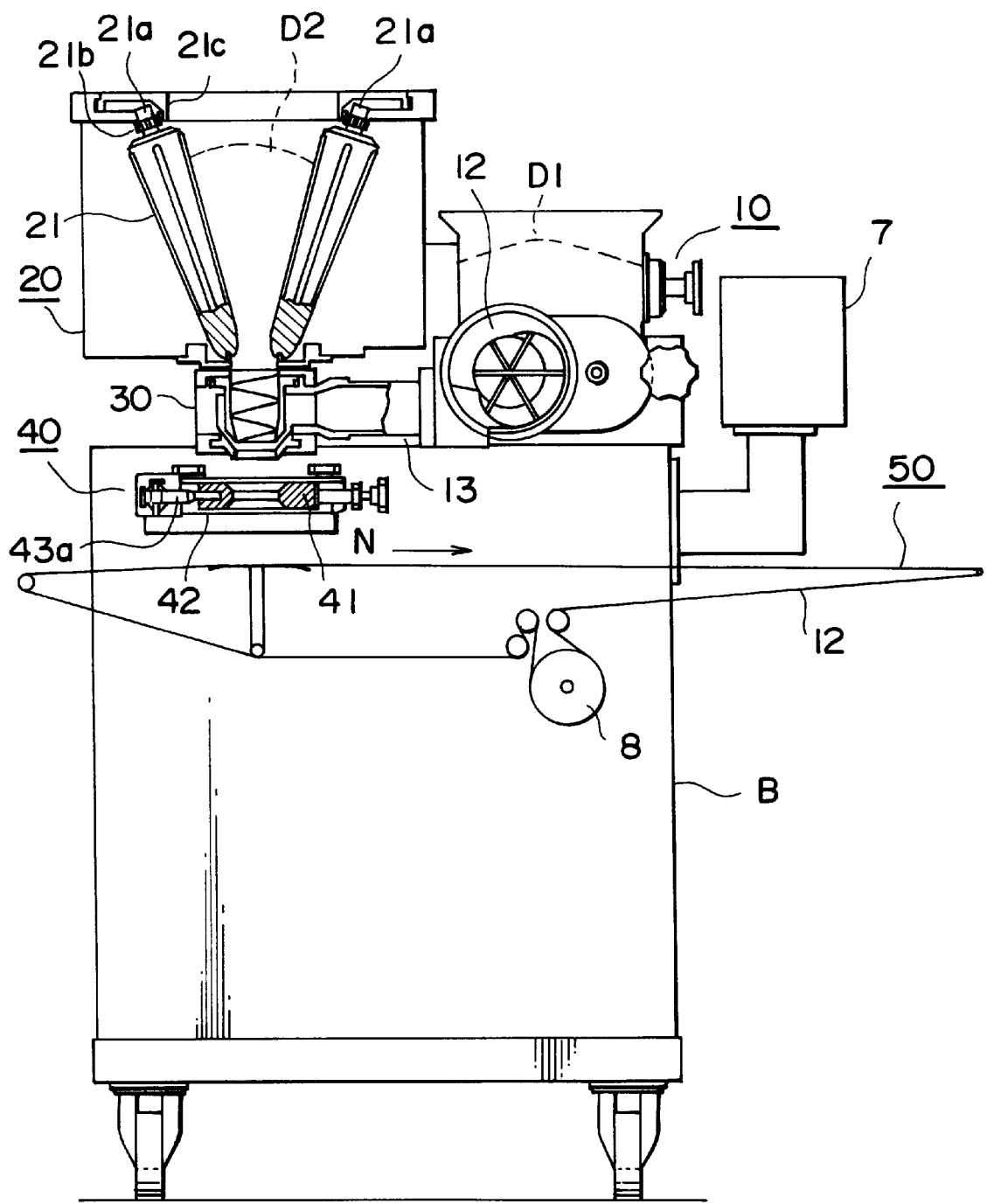
FIG. 2 shows a side view, partly in cross section, of the apparatus for discharging a food material of this invention.

FIG. 2 shows the apparatus of this invention. On a base B, a crust-material supply section 10, a filling-supply section 20, a material-joining section 30, a cutting section 40, and a conveyor section 50, are disposed. The conveyor section 50 includes a drive-roller 8 to be driven by a motor (not shown). The drive-roller 8 causes an endless belt 12 to advance in the direction indicated by an arrow N. The operations of the above sections are controlled by a controller 7.

The crust-material supply section 10 is provided with a screw mechanism 11 (see FIG. 4), and with a pumping mechanism 12 in front of the mechanism 11. The section 10 supplies a crust-material D1 through the screw mechanism 11 to the material-joining section 30. The filling-supply section 20, which supplies a filling D2, comprises a plurality of supply rollers 21. These are circularly disposed to enclose a funnel-shaped space that is surrounded by the supply rollers 21. The upper part of the funnel-shaped space is wide and the lower part of it is narrow.

Figure 5:
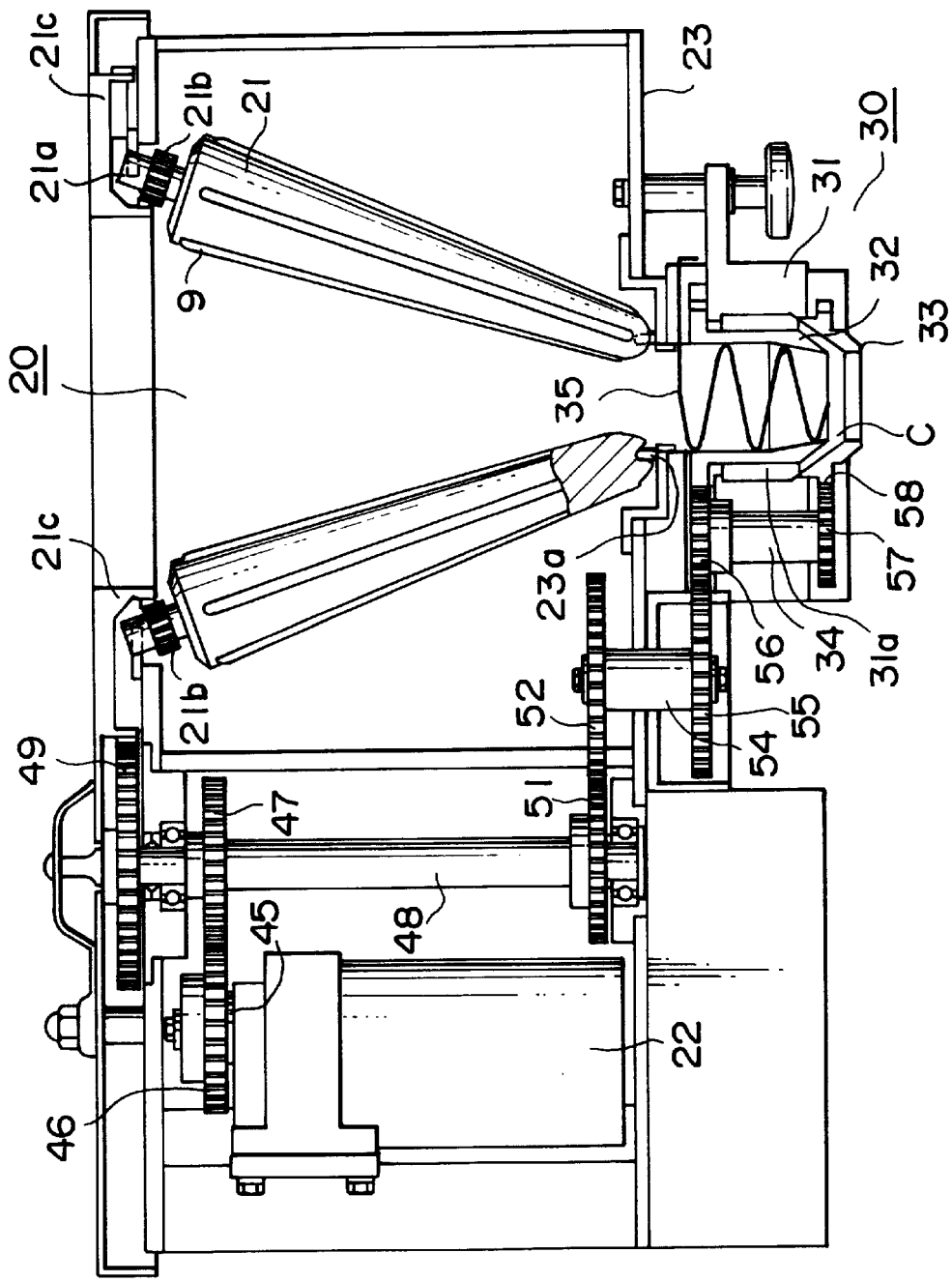
FIG. 5 shows a side view in cross section of the material-joining section 30 of this invention.

As in FIG. 5, the supply roller 21 is provided with ridges 9. The lower end of each supply roller 21 is supported by a support pin 23a that is mounted on a frame 23 of the filling-supply section 20. A rotating shaft 21a of the supply roller 21, disposed at the upper end of each supply roller 21, is rotatably supported by, and located at the upper part of, the frame 23. A gear 21b is provided on the rotating shaft 21a so as to engage a ring gear 21c. When a drive motor 22 is energized, its rotational drive force is transmitted through a rotating shaft 45, a gear 46, a gear 47, a rotating shaft 48, a gear 49, and the ring gear 21c, to the respective gears 21b, so that the supply rollers 21 are rotated in the same direction at the same speed.

Figure 4:
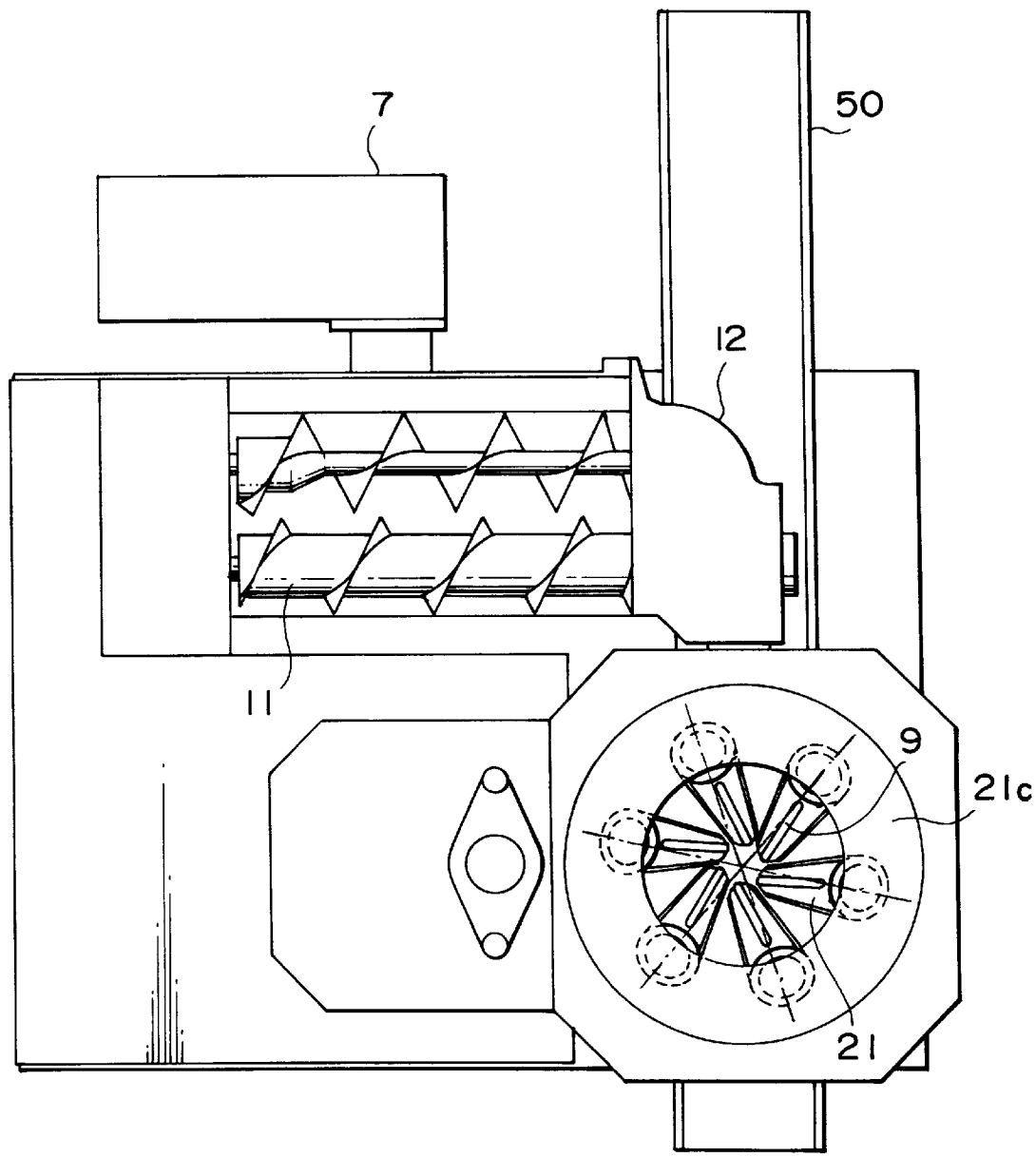
FIG. 4 shows a plan view, partly in cross section, of the apparatus for discharging a food material of this invention.

As in FIG. 4, six supply rollers 21 are circularly disposed to form the funnel-shaped space. The central axis of each supply roller is caused to deviate from an imaginary line directed to the center of an imaginary circle formed by the surrounding supply rollers.

In FIG. 5, the material-joining section 30 comprises a housing 31 that includes a housing inner chamber 31a. A supply pipe 32 is disposed in the housing inner chamber 31a. The supply pipe 32 is located under the lower part of the funnel-shaped space that is surrounded by the supply rollers 21, so that the central axis of the supply pipe is concentric with that of the space.

An inlet for the housing inner chamber 31a is provided at the side of the housing 31. A crust-material passageway 13 (see FIG. 2), extending from the crust-material supply section 10, is connected to the inlet.

A rotation-ring 33 is inserted into an opening disposed on the lower face of the housing 31 so that the axis of the rotation-ring 33 is concentric with that of the supply pipe 32. Also, the rotation-ring 33 is positioned to provide a predetermined gap, namely a ring-shaped gap C, between the rotation-ring 33 and the lower end of the supply pipe 32. The ring-shaped gap C is an outlet for the crust-material D1.

The rotation-ring 33 is provided with teeth 58 at its outer periphery and they engage a gear 57 mounted on the lower end of a rotating shaft 34. On the other hand, the rotating shaft 48 is provided at its lower end with a gear 51 which engages a gear 52. It is mounted on the upper end of a rotating shaft 54, on the lower end of which a gear 55 is mounted. It engages a gear 56 which is mounted on a rotating shaft 34. Therefore, when the motor 22 is energized, the rotation-ring 33 is rotated by the drive transmission through these gears.

The supply pipe 32 is provided at its upper and outer periphery with teeth which engage the gear 56. Therefore, when the motor 22 is energized, the supply pipe 32 is rotated by the drive transmission through these gears.

Inside the supply pipe 32, a spirally-shaped scraper 35 is disposed. As in FIG. 5, the upper end of the spirally-shaped scraper 35 is, separately from the supply pipe 32, fixed to the housing 31. Therefore, even when the supply pipe 32 is rotated, the scraper 35 does not rotate.

Below the operation of the apparatus is explained.

When the filling D2 is charged into the funnel-shaped space and the motor 22 is energized, the supply rollers 21 are rotated so as to apply forces in the circumferential direction to the filling D2. Therefore, the filling D2 is rotated in its circumferential direction while it is moved downward by its own weight.

As in FIG. 4, the central axes of the supply rollers 21 are caused to deviate from the imaginary lines directed to the center of the imaginary circle formed by the surrounding rollers. Therefore, the peripheral shape of the lower part of the funnel-shaped space is somewhat twisted. This twisting tends to accelerate the feeding actions of the rollers for a material charged into the funnel-shaped space. Therefore, the filling D2 can be fed downward more steadily compared to where the rollers are disposed so that their central axes are directed to the center of the circle.

In this embodiment the ridges 9 are provided on the surface of each supply roller. Therefore, the frictional engagement of the supply roller with the filling D2 can be enhanced, so that it can be steadily fed downward.

Figure 8:
FIG. 8 shows a side view of the supply roller 21 on which longitudinal grooves are provided.
Figure 9:
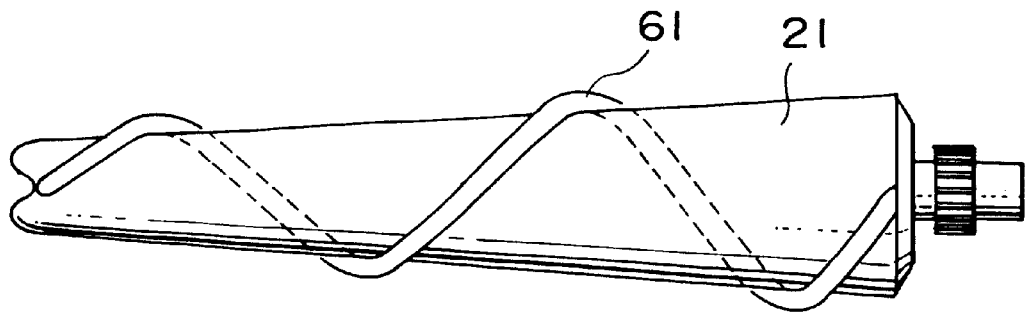
FIG. 9 shows a side view of the supply roller 21 on which a spirally-shaped ridge is provided.

In place of the ridges, as in FIG. 8, the supply roller 21 can be provided with longitudinal grooves 60. Also, as in FIG. 9, a ridge 61 can be spirally shaped. These grooves 60 and ridges 61 can enhance the frictional engagement of the supply rollers with the filling D2, thereby steadily feeding it downward without slipping.

Below the operation of the scraper will be explained.

The filling D2 that is fed downward from the funnel-shaped space then enters the supply pipe 32. Although the spirally-shaped scraper 35 does not rotate, the filling D2 is subjected to the feeding action downward due to the rotation of the supply pipe 32 and the spiral shape of the scraper 35. This is due to the movement of the supply pipe 32 relative to the scraper 35. This relative movement has a mixing action that stirs the filling D2. Therefore, the filling D2 that is discharged from the supply pipe 32 can be uniformly shaped. This leads, after the filling D2 is joined with the crust-material D1 to make a two-layered rod-like body, to it also having a uniform shape.

Figure 6:
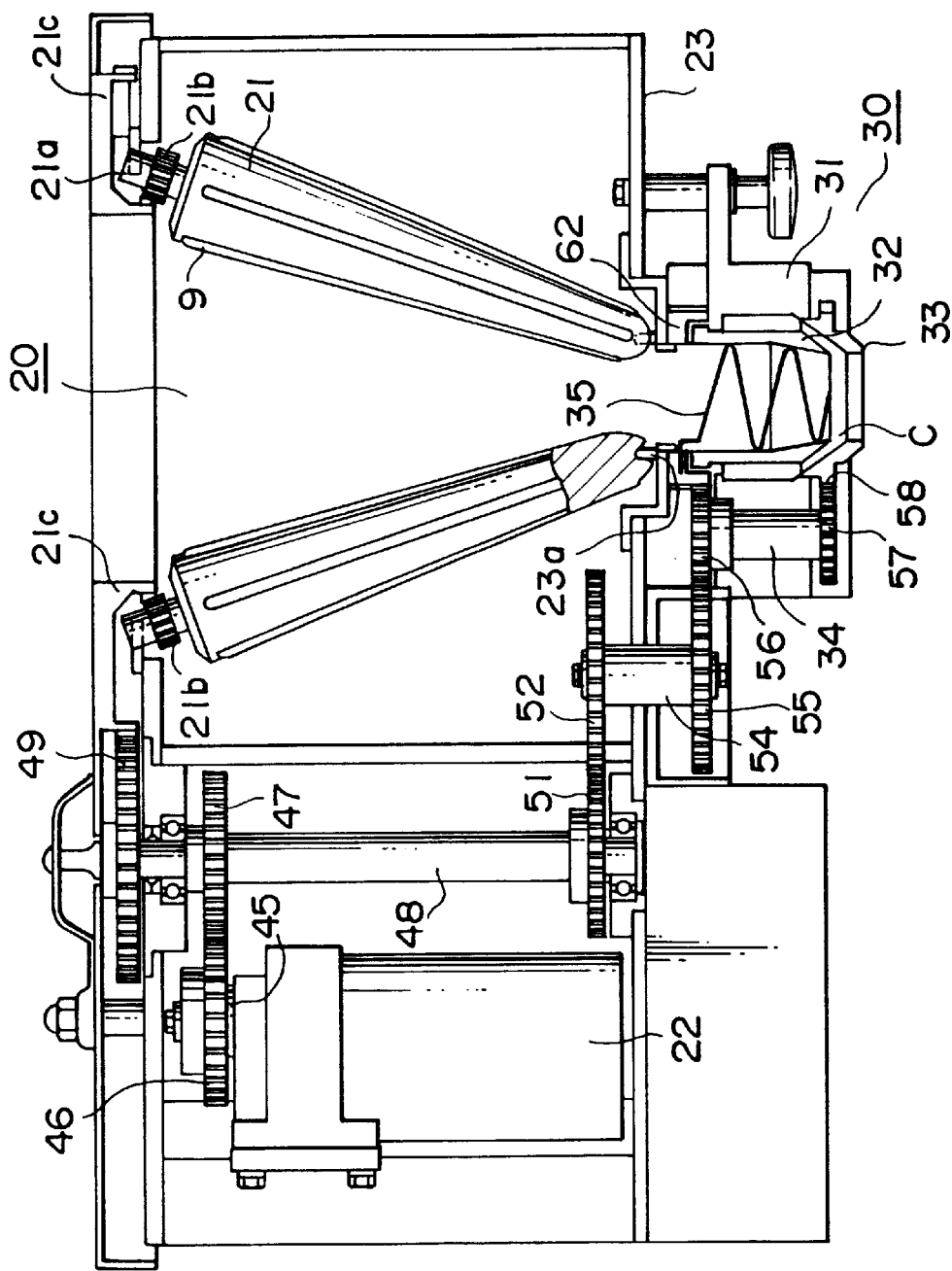
FIG. 6 shows a side view in cross section of the material-joining section 30, to illustrate that the upper end of the scraper 35 is connected to a ring gear 62 which engages a gear 56, and a supply pipe 32 does not engage the gear 62.
Figure 7:
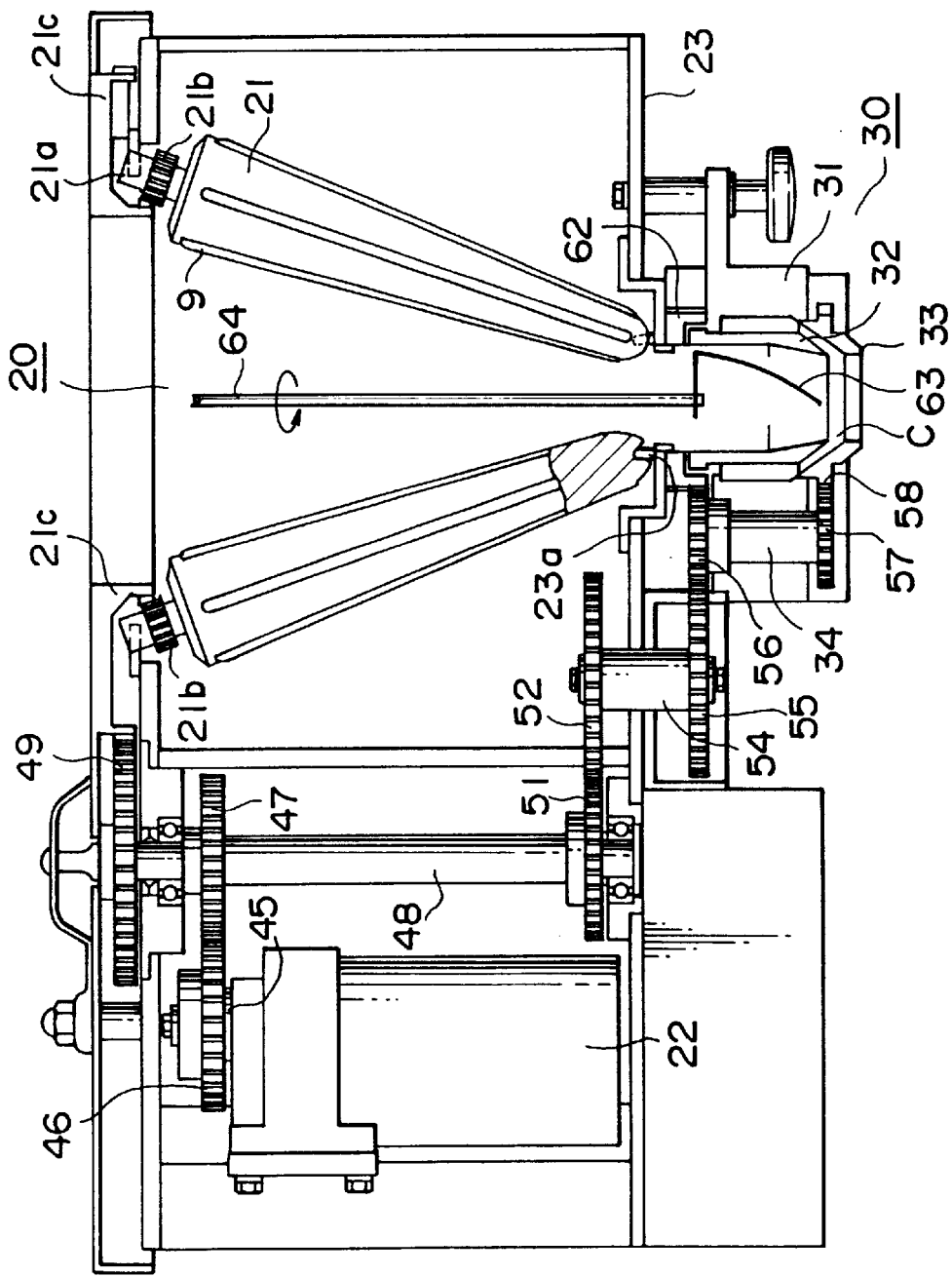
FIG. 7 shows a side view in cross section of the material-joining section 30, to illustrate that in place of the spirally-shaped scraper 35, an arm 63, which is mounted on the lower end of a rotary shaft 64, is provided.

In place of the rotation of the supply pipe 32, the spirally-shaped scraper 35 can be rotated. To carry this out, as in FIG. 6, the upper end of the spirally-shaped scraper 35 is fixed to a ring gear 62 which engages the gear 56. Futher, the engagement of the supply pipe 32 at its upper end with the gear 62 is released. Thus, the supply pipe 32 is adapted to be not rotated. When the motor 22 is energized the filling D2 is fed downward by the feeding action due to the spiral shape of the scraper 35. Also, in place of the scraper 35, as in FIG. 7, an arm 63 can be used. In this case the engagement of the supply pipe 32 at its upper end with the gear 62 is released. The arm 63 extends to a position adjacent the inner wall of the pipe 32 and further extends downward while it is bent, to form a spiral shape. The arm 63 is mounted on the lower end of a rotating shaft 64, the axis of which is concentric with that of the supply pipe 32. The shaft 64 is driven by a motor (not shown). When the motor 22 is energized the filling D2 is fed downward by the feeding action due to the spiral shape of the arm 63.

The spirally-shaped scraper 35 and the arm 63 are positioned adjacent the inner wall of the supply pipe 32 or positioned so as to contact the inner wall of the supply pipe 32. Therefore, viscous materials, such as boiled rice materials adhering to the inner wall of the supply pipe 32, can be peeled off and fed downward. The scraper can be shaped so that when the supply pipe is rotated it can move over the entire area of the supply pipe 32. Therefore, the shape of a scraper is not limited to that of a spiral. For instance, a plurality of linearly-shaped scrapers, each as long as a supply pipe, can be fixedly mounted, at equal intervals, on the frame 23, so that they are positioned within the supply pipe, parallel with its axis. The scrapers can be provided so that they contact the inner wall of the supply pipe or so that they are positioned adjacent the inner wall.

The crust-material D1 fed from the crust-material passageway 13 (see FIG. 2) is supplied into the housing inner chamber 31a and discharged from the ring-shaped gap C (see FIG. 5). The crust-material D1 discharged from the ring-shaped gap C and the filling D2 discharged from the supply pipe 32 are joined to form the two-layered rod-like body, and it is discharged from the material-joining-section 30 (see FIG. 5).

Usually when the apparatus of this invention is actuated, the rotation-ring 33 is rotated to apply a circumferential force to the outer periphery of the two-layered rod-like body so as to uniformly shape it.

Figure 3:
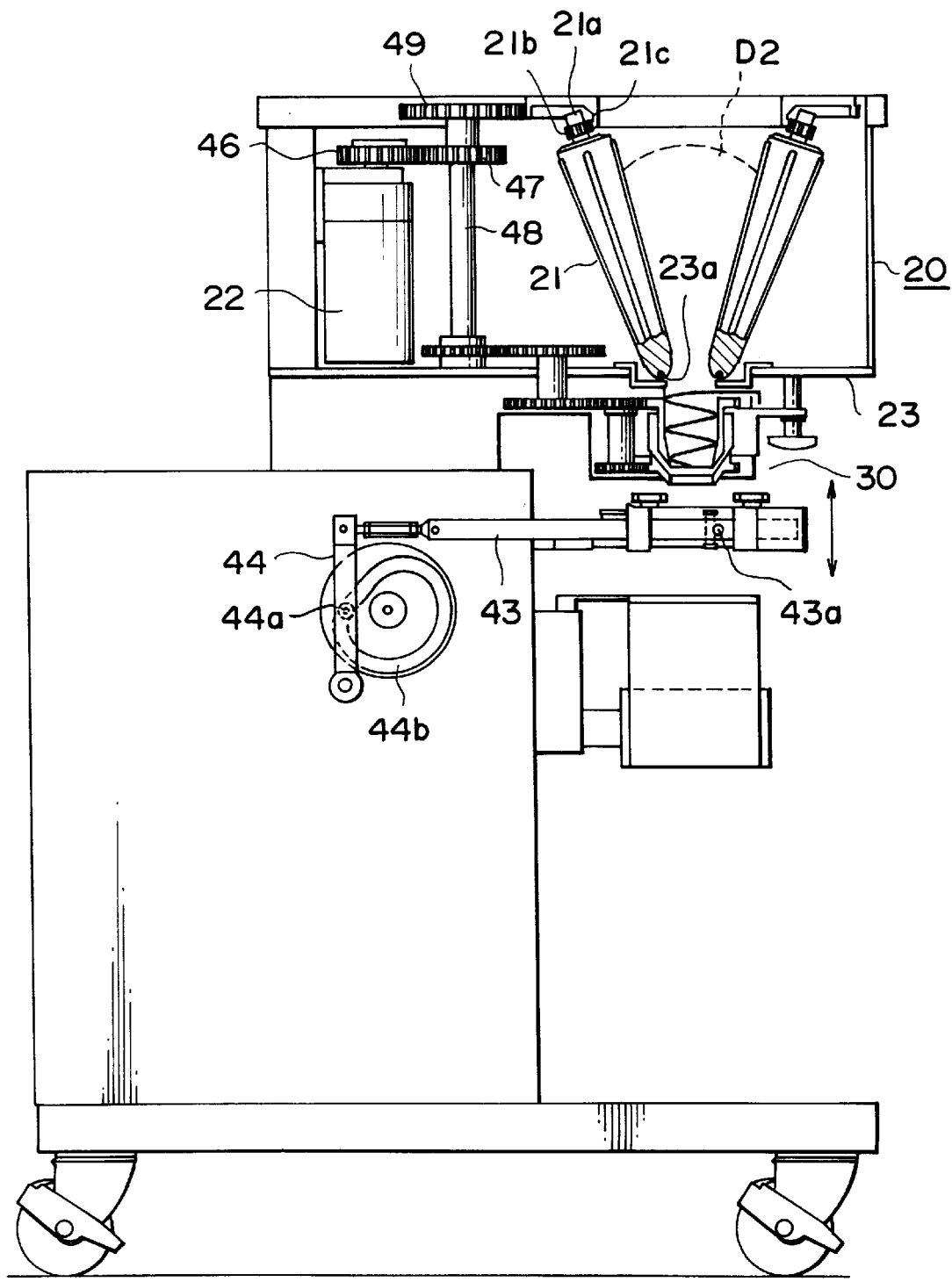
FIG. 3 shows an elevational view, partly in cross section, of the apparatus for discharging a food material of this invention.

As the cutting section 40 (see FIGS. 2 and 3) positioned under the material-joining-section 30, the apparatus disclosed in Japanese Patent Publication No. 4-53453 (corresponding to U.S. Pat. No. 5,223,277) can be used. That apparatus comprises an assembly consisting of at least three cutting members that each can be slidably moved so as to form a central hole. It is made to open or close so as to allow a food material to enter it and be cut. Six cutting members 41 are received in a case 42. A cutting member drive-pin 43a at one end of a drive rod 43 is mounted on one of the cutting members 41. The other end of the drive rod 43 is connected to one end of a swinging arm 44. The other end of it is swingably mounted on the base B. A cam-follower 44a is mounted on the middle part of the swinging arm 44 so that the cam-follower 44a engages the cam groove of a cam 44b. Therefore, when the cam 44b is rotated by a drive motor (not shown), the drive rod 43 is caused to advance or retract, alternately, thereby to open or close the hole of the assembly, thereby cutting the two-layered rod-like body discharged from the material-joining-section 30 to prepare a rod-like body unit of a predetermined length. The above movements are synchronized with those of the material-joining-section 30 by the controller 7. The rod-like body unit is then fed by the endless belt 12 in the direction indicated by an arrow N.

In the method and apparatus of this invention the grooves or ridges are provided on the surfaces of the supply rollers forming the funnel-shaped space. Therefore, the frictional engagement of the supply rollers with the food material is enhanced to thereby steadily feed the food material, such as the boiled rice materials or the rice dumplings covered by bean jam, without slipping.

In the apparatus for discharging a food material of this invention the supply pipe with the scraper is disposed under the food-material-supply section. This scraper is positioned adjacent the inner wall of the supply pipe or positioned such that the scraper slidably contacts the inner wall of said supply pipe. Therefore, the food material, such as the boiled rice materials or the rice dumplings covered by bean jam, adhering to the inner wall of the supply roller, can be steadily peeled off therefrom.

When the scraper 35 is spirally-shaped, the movement of the supply pipe 32 in relation to the scraper 35 stirs the filling D2 in the supply pipe 32. Therefore, the filling D2 that is discharged from the supply pipe 32 can be uniformly shaped.

What is claimed is:

1. A method of discharging a food material comprising circularly disposing a plurality of supply rollers to form a funnel-shaped space to receive said food material, providing grooves or ridges on the surface of each supply roller to enhance the frictional engagement of said supply rollers with said food material, and charging said food material into said funnel-shaped space, and rotating said supply rollers so as to move said food material and to feed it downward, characterized by:

causing said supply rollers to rotate in the same direction, and causing the central axes of each said supply rollers to deviate from radial lines of the circle formed by the surrounding supply rollers, thereby steadily feeding said food material downward.

2. An apparatus for discharging a food material comprising a food-material-supply section which supplies a food material downward, said food-material-supply section comprising a plurality of rotatable supply rollers for supplying a food material downward, said supply rollers being circularly disposed so that they form a funnel-shaped space to receive said food material, the surface of each supply roller being provided with grooves or ridges, characterized by:

means for rotating said supply rollers in the same direction, and characterized in that the central axes of said supply rollers deviate from radial lines of the the circle formed by the surrounding supply rollers.

3. An apparatus for discharging a food material comprising a food-material-supply section that supplies a food material downward, said food-material-supply section comprising a plurality of rotatable supply rollers for supplying a food material downward, said supply rollers being circularly disposed so that they form a funnel-shaped space to receive said food material, characterized by a supply pipe disposed under said food-material-supply section, to make a passageway for the food material, a scraper provided in said supply pipe positioned adjacent an inner wall of said supply pipe or positioned so that said scraper slidably contacts the inner wall of said supply pipe, so as to prevent said food material from adhering to the inner wall of said supply pipe, and a means for rotating said supply pipe or said scraper relative to said scraper or said supply pipe, respectively.

4. The apparatus of claim 3, in which said rotating means is a means for rotating said supply pipe.

5. The apparatus of claim 3, in which said rotating means is a means for rotating said scraper.

6. The apparatus of claim 3, in which said scraper is spirally-shaped.

7. The apparatus of claim 4, in which said scraper is spirally-shaped.

8. The apparatus of claim 5, in which said scraper is spirally-shaped.

* * * * *

UNITED STATES PATENT AND TRADEMARK OFFICE
CERTIFICATE OF CORRECTION

PATENT NO. : 6,062,373
DATED : May 16, 2000
INVENTOR(S) : Kazuyoshi Onoguchi et al.

It is certified that error appears in the above-identified patent and that said Letters Patent is hereby corrected as shown below:

In the Claims

In claim 1, line 11, please delete "each".

In claim 2, line 12, please change "lines of the the circle" to --lines of the circle--.

Signed and Sealed this

Seventeenth Day of April, 2001

Attest:

NICHOLAS P. GODICI

Attesting Officer    Acting Director of the United States Patent and Trademark Office